(12) United States Patent
Koinuma et al.

(10) Patent No.: US 9,652,299 B2
(45) Date of Patent: May 16, 2017

(54) CONTROLLING THE STATE OF A PROCESS BETWEEN A RUNNING AND A STOPPED STATE BY COMPARING IDENTIFICATION INFORMATION SENT PRIOR TO EXECUTION

(71) Applicant: FUJITSU LIMITED, Kawasaki-shi (JP)

(72) Inventors: Hideyuki Koinuma, Yokohama (JP); Hideyuki Kizawa, Kawasaki (JP); Keiji Miyauchi, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 469 days.

(21) Appl. No.: 13/653,501

(22) Filed: Oct. 17, 2012

(65) Prior Publication Data
US 2013/0174161 A1   Jul. 4, 2013

(30) Foreign Application Priority Data
Dec. 28, 2011  (JP) .................................. 2011-290026

(51) Int. Cl.
G06F 9/52  (2006.01)
(52) U.S. Cl.
CPC ...................................... *G06F 9/52* (2013.01)
(58) Field of Classification Search
None
See application file for complete search history.

(56) References Cited

U.S. PATENT DOCUMENTS

| | | |
|---|---|---|
| 6,192,391 B1 | 2/2001 | Ohtani |
| 6,308,223 B1 | 10/2001 | Opgenoorth |
| 6,978,459 B1 | 12/2005 | Dennis et al. |
| 7,707,584 B2 | 4/2010 | Driesner et al. |
| 8,312,458 B2 | 11/2012 | Arimilli et al. |
| 8,490,118 B2* | 7/2013 | Colombo et al. ............. 719/328 |
| 2003/0126186 A1 | 7/2003 | Rodgers et al. |

(Continued)

FOREIGN PATENT DOCUMENTS

| | | |
|---|---|---|
| CN | 1716186 | 1/2006 |
| JP | 2003-330739 A | 11/2003 |

(Continued)

OTHER PUBLICATIONS

Japanese Office Action mailed Nov. 5, 2013 for corresponding Japanese Application No. 2011-290026, with Partial English-language Translation.

(Continued)

*Primary Examiner* — Meng An
*Assistant Examiner* — Michael Ayers
(74) *Attorney, Agent, or Firm* — Fujitsu Patent Center

(57) ABSTRACT

A hardware thread causes a SleepID register of a WAKEUP signal generation unit to store a SleepID that identifies the hardware thread when suspending a process due to waiting for a process by another CPU. The WAKEUP signal generation unit causes the WAKEUP data register of the WAKEUP signal generation unit to store a SleepID notified by a node when a process that the hardware thread waits ends. The WAKEUP signal generation unit outputs a WAKEUP signal that cancels the stop of the hardware thread to the hardware thread when the SleepIDs of the SleepID register and the WAKEUP data register agree with each other.

6 Claims, 8 Drawing Sheets

(56) References Cited

U.S. PATENT DOCUMENTS

| 2006/0005197 A1* | 1/2006 | Saha et al. ................... 718/104 |
| 2008/0077921 A1* | 3/2008 | Chaudhary ............... G06F 9/52 |
| | | 718/100 |
| 2009/0064166 A1* | 3/2009 | Arimilli ................ G06F 9/522 |
| | | 718/105 |

FOREIGN PATENT DOCUMENTS

| JP | 2006-31691 | 2/2006 |
| JP | 2010-231556 A | 10/2010 |
| WO | WO-03-058447 A2 | 7/2003 |

OTHER PUBLICATIONS

Extended European Search Report dated Feb. 17, 2014 for corresponding European Application No. 12191585.4.
Japanese Office Action mailed Apr. 14, 2015 for corresponding Japanese Patent Application No. 2011-290026, with Partial English Translation, 13 pages.
Chinese Office Action mailed Sep. 18, 2015 for corresponding Chinese Patent Application No. 201210500756.3, with English Translation, 17 pages.

* cited by examiner

FIG.3

| CPU ID | WAKEUP DATA |

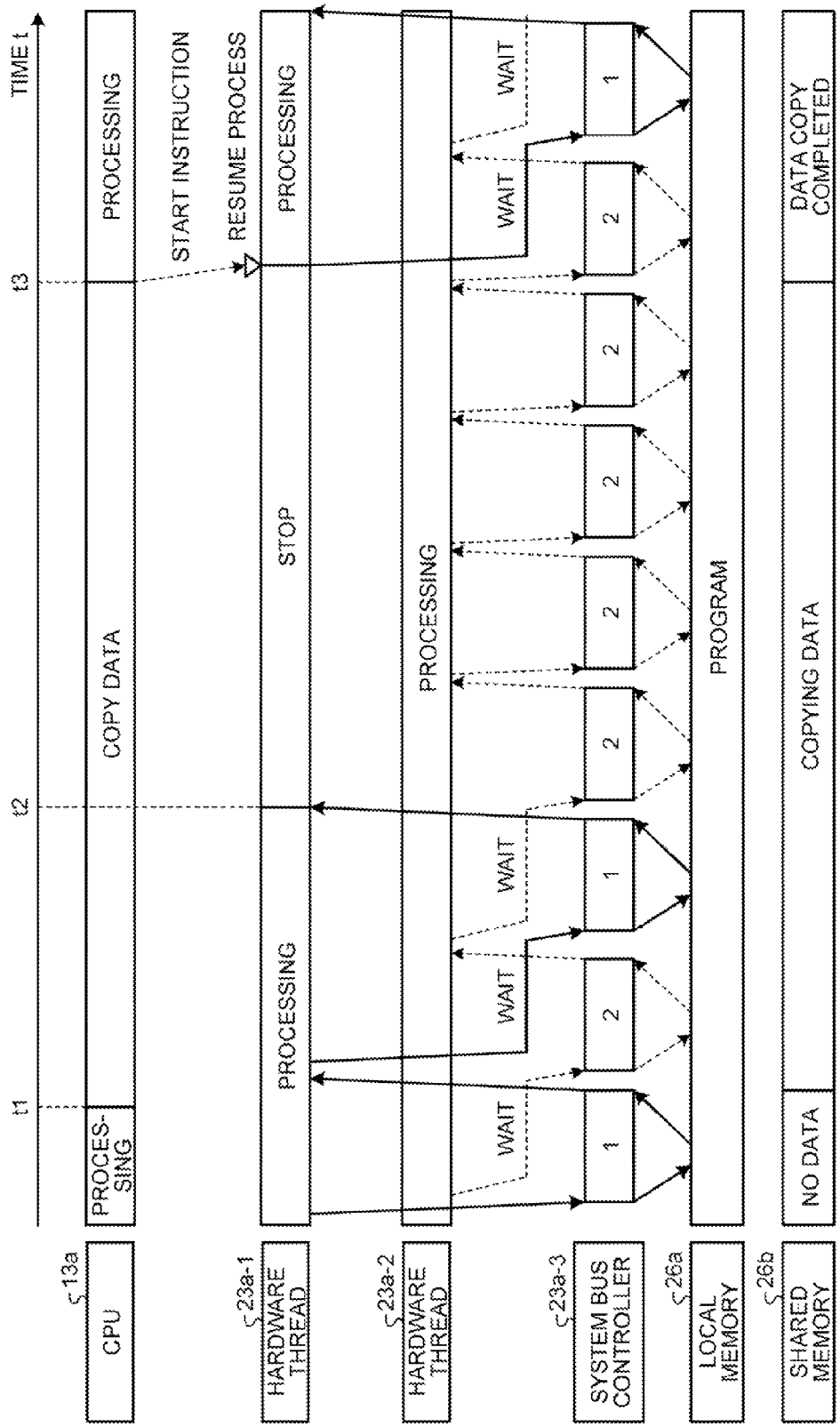

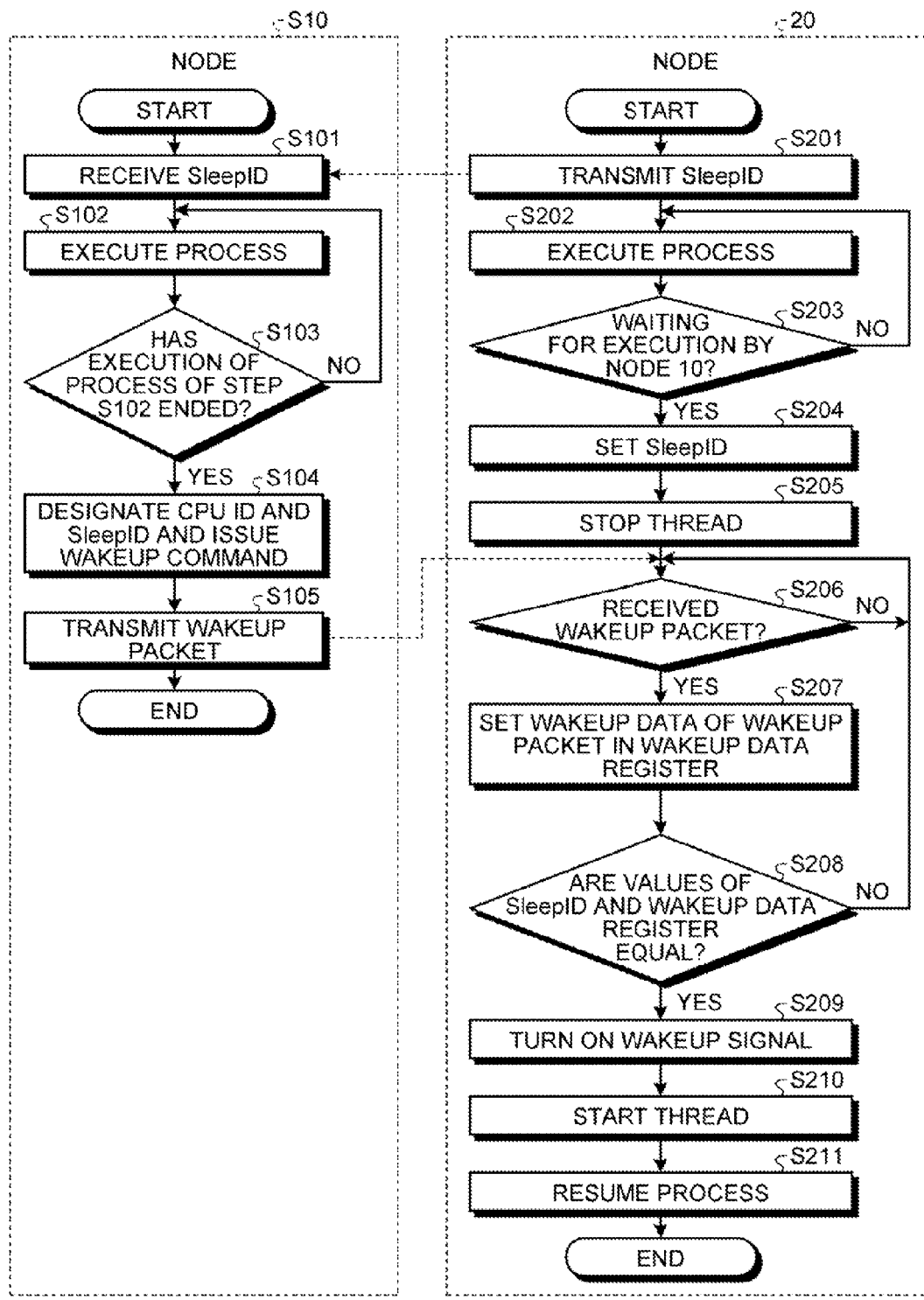

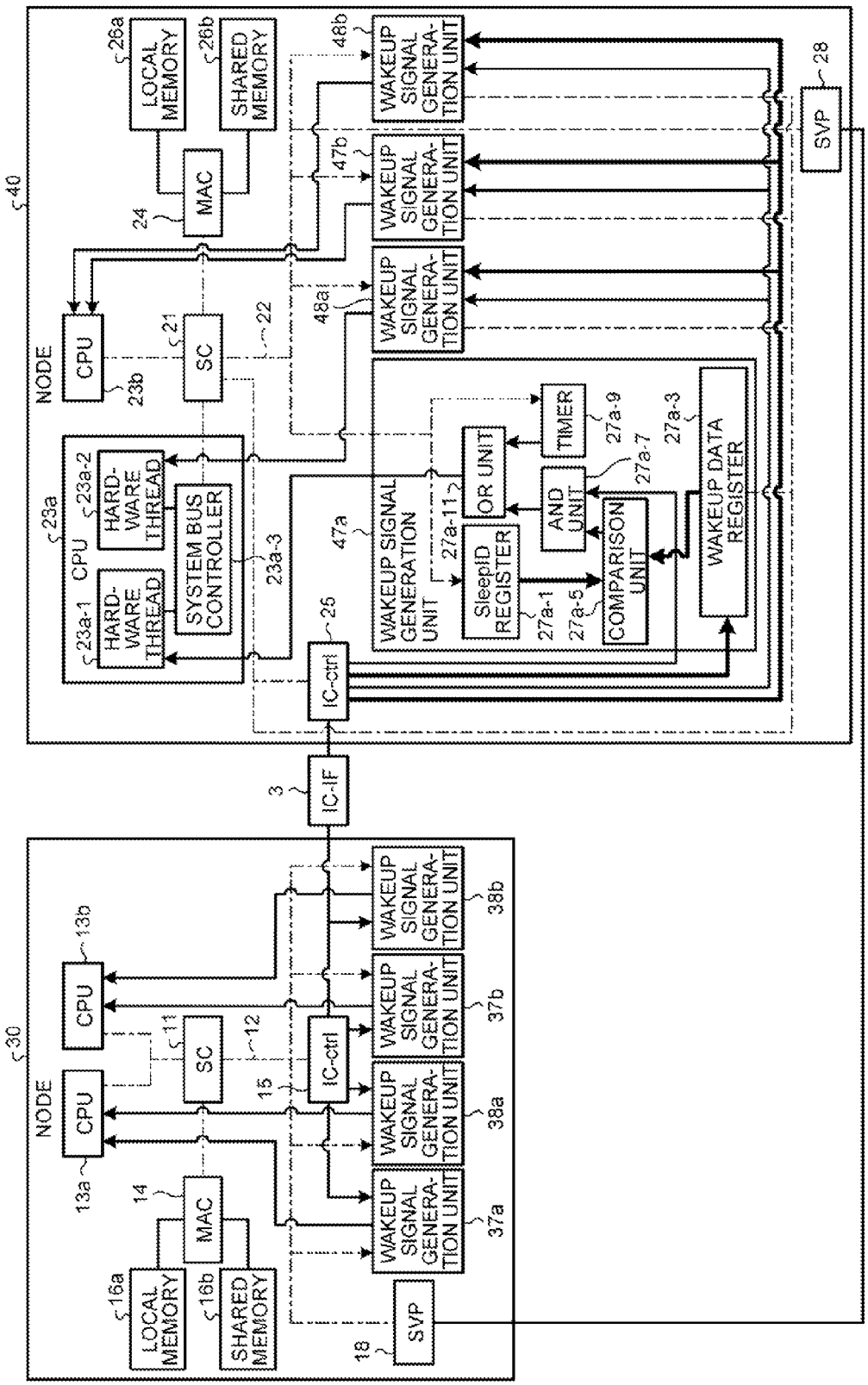

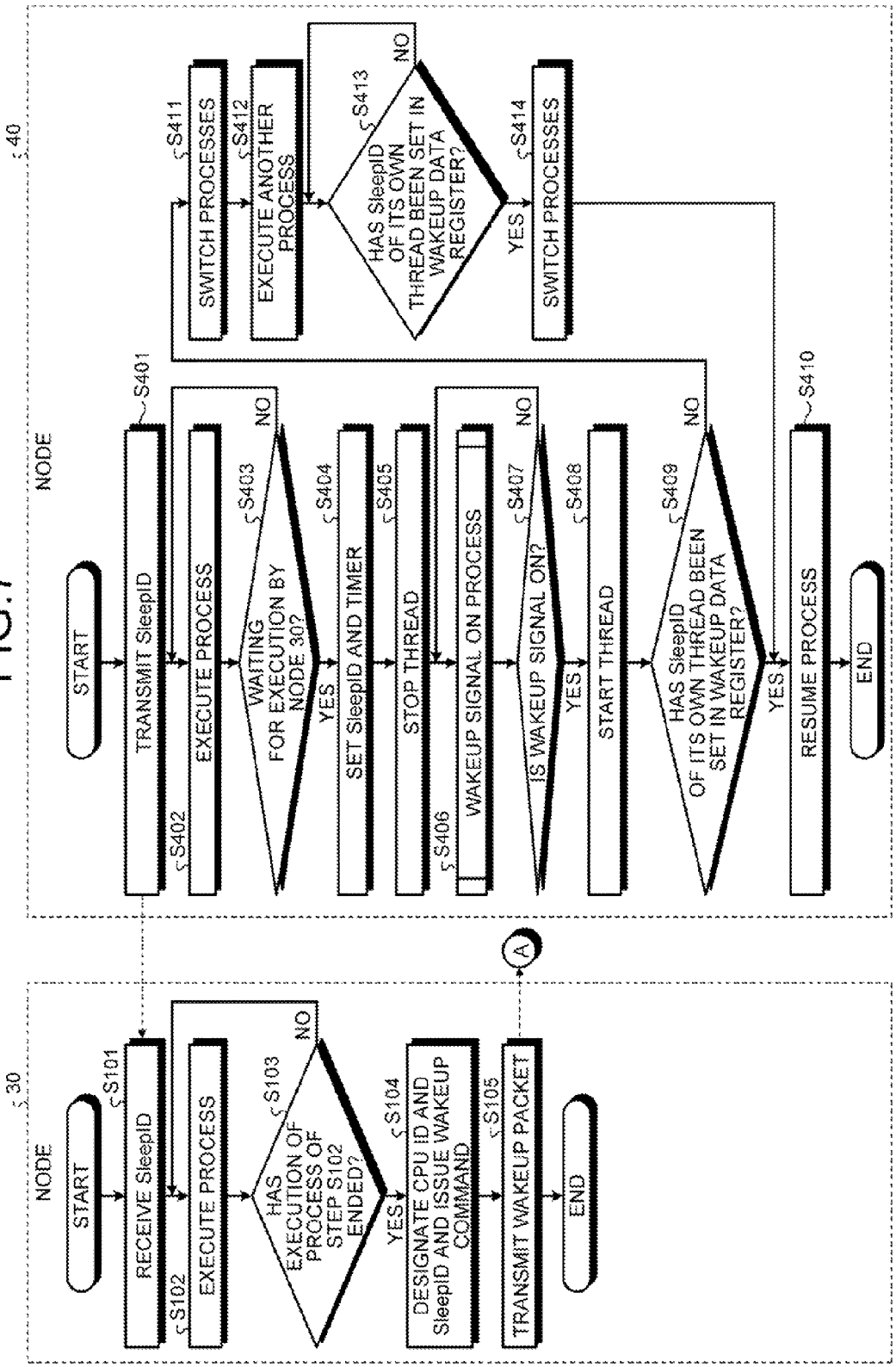

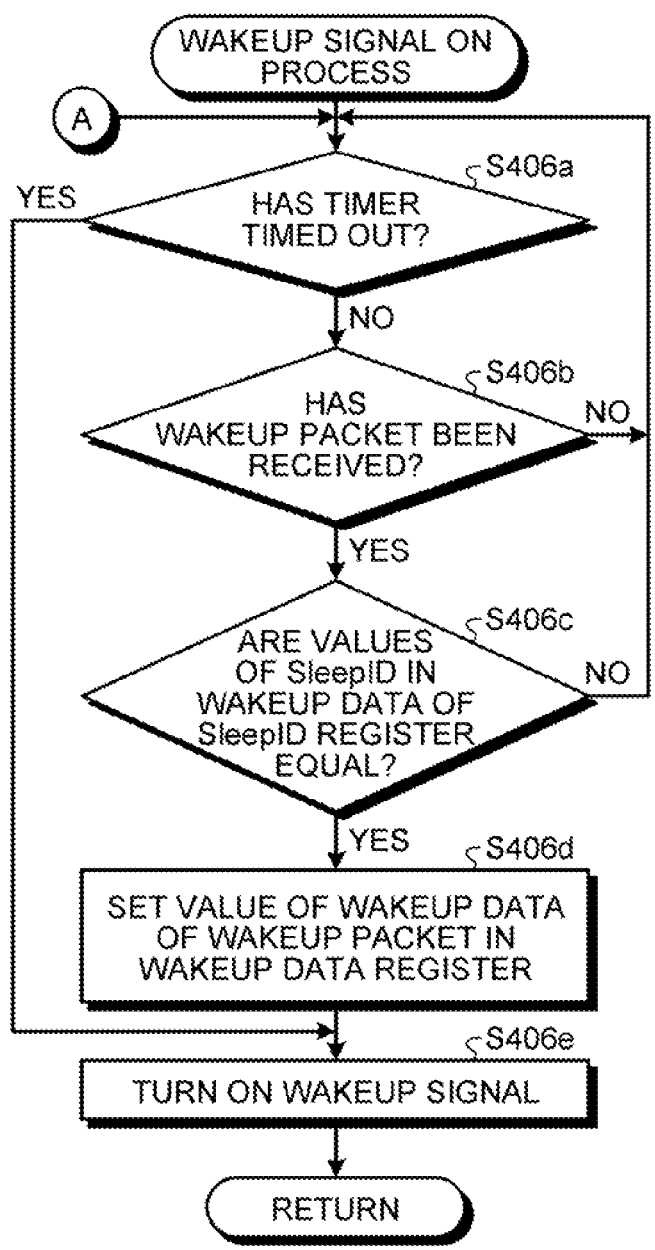

CONTROLLING THE STATE OF A PROCESS BETWEEN A RUNNING AND A STOPPED STATE BY COMPARING IDENTIFICATION INFORMATION SENT PRIOR TO EXECUTION

CROSS-REFERENCE TO RELATED APPLICATION

This application is based upon and claims the benefit of priority of the prior Japanese Patent Application No. 2011-290026, filed on Dec. 28, 2011, the entire contents of which are incorporated herein by reference.

FIELD

The embodiments discussed herein are related to an information processing apparatus and a method of controlling an information processing apparatus.

BACKGROUND

There has been conventionally various control methods that in an information processing apparatus that includes a plurality of nodes including processors and memory units, the processors included in the plurality of nodes control synchronization between processes to execute in their hardware threads.

Generally, a thread is the unit of processing of a program to be executed concurrently by software, and multithreading is the concurrent execution of a plurality of threads on one processor.

On the other hand, hardware threading is also known as hardware multithreading, and is referred to as the following technology. For example, hardware threading is a technology for sharing hardware resources such as a functional unit, a register, a TLB (Translation Look-aside Buffer), and a system bus controller on the same core included in a CPU (Central Processing Unit). In other words, hardware threading is a technology for sharing hardware resources to simultaneously operate a plurality of threads on the same core. With regard to hardware threading, known are various implementation methods, such as VMT (Vertical Multi-Threading) and SMT (Simultaneous Multi-Threading), that operate a plurality of threads by time-division multiplexing in addition to the technology for simultaneously operating a plurality of threads.

Considered is, for example, a case where in the above-mentioned hardware threading, a running process in a first hardware thread contained in a first processor included in a first node needs data stored in a second memory unit included in a second node.

As a method of controlling synchronization between processes in the above-mentioned case, there is, for example, a control method in the polling system. In other words, the first processor suspends a running process in the first hardware thread and performs a polling process to access a first memory unit until a process that a second processor included in the second node copies data to the first memory unit is complete. When the process that the second processor copies data to the first memory unit is complete, the first processor reads the data from the first memory unit and resumes the suspended process in the first hardware thread.

Moreover, as another method of controlling synchronization between processes in the above-mentioned case, there is, for example, a control method in an interrupt system. In other words, the first processor suspends a running process in the first hardware thread, and is subsequently given an interrupt notification that notifies that the second processor has completed the process to copy data to the first memory unit. The first processor then executes, as kernel processes of an OS (Operating System), various processes such as a register saving process with the switching of processes, an authorization switching process by the OS, and a process of starting an interrupt handler for reading data from the first memory unit. The first processor then reads the data from the first memory unit to resume the suspended process in the first hardware thread.

Patent Literature 1: Japanese National Publication of International Patent Application No. 2006-500639
Patent Literature 2: Japanese Laid-open Patent Publication No. 2006-031691

However, in the above-mentioned known technologies, although the process is suspended in the first hardware thread, the polling process to access the first memory unit is performed. Therefore, there is a problem that hardware resources shared among a plurality of hardware threads, such as a system bus controller shared among the other hardware threads, are not used effectively in the first processor.

Moreover, in the above-mentioned known technologies, there is a problem that it is not possible to quickly switch processes since kernel processes by the OS such as register saving and restoration processes with the switching of processes to be executed in the first hardware thread incur overhead.

SUMMARY

According to an aspect of the embodiments, an information processing apparatus includes a plurality of nodes, wherein each of the nodes includes a processing unit that executes a process and controls a state of the process, a memory unit that stores identification information that identifies the processing unit, when the processing unit shifts the state of the process from a first state to a second state, a receiving unit that receives identification information transmitted from another processing unit included in the own node or another node, and an output unit that outputs a control signal that shifts the state of the process from the second state to the first state, when the identification information received by the receiving unit agrees with the identification information stored in the memory unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a view illustrating a configuration of a WAKEUP packet according to the first embodiment;
FIG. 4 is a time chart illustrating processes according to the first embodiment;

FIG. 5 is a flowchart illustrating processes according to the first embodiment;

FIG. 6 is a block diagram illustrating a configuration of an information processing apparatus according to a second embodiment;

FIG. 7 is a flowchart illustrating processes according to the second embodiment; and FIG. 8 is a flowchart illustrating a WAKEUP signal ON process according to the second embodiment.

DESCRIPTION OF EMBODIMENTS

Preferred embodiments of the present invention will be explained with reference to accompanying drawings. The following embodiments simply illustrates examples, and do not limit the technology of the disclosure. Moreover, the embodiments may be combined as appropriate within a range where a contradiction does not arise.

[a] First Embodiment

Configuration of Information Processing Apparatus of First Embodiment

Figure 1:
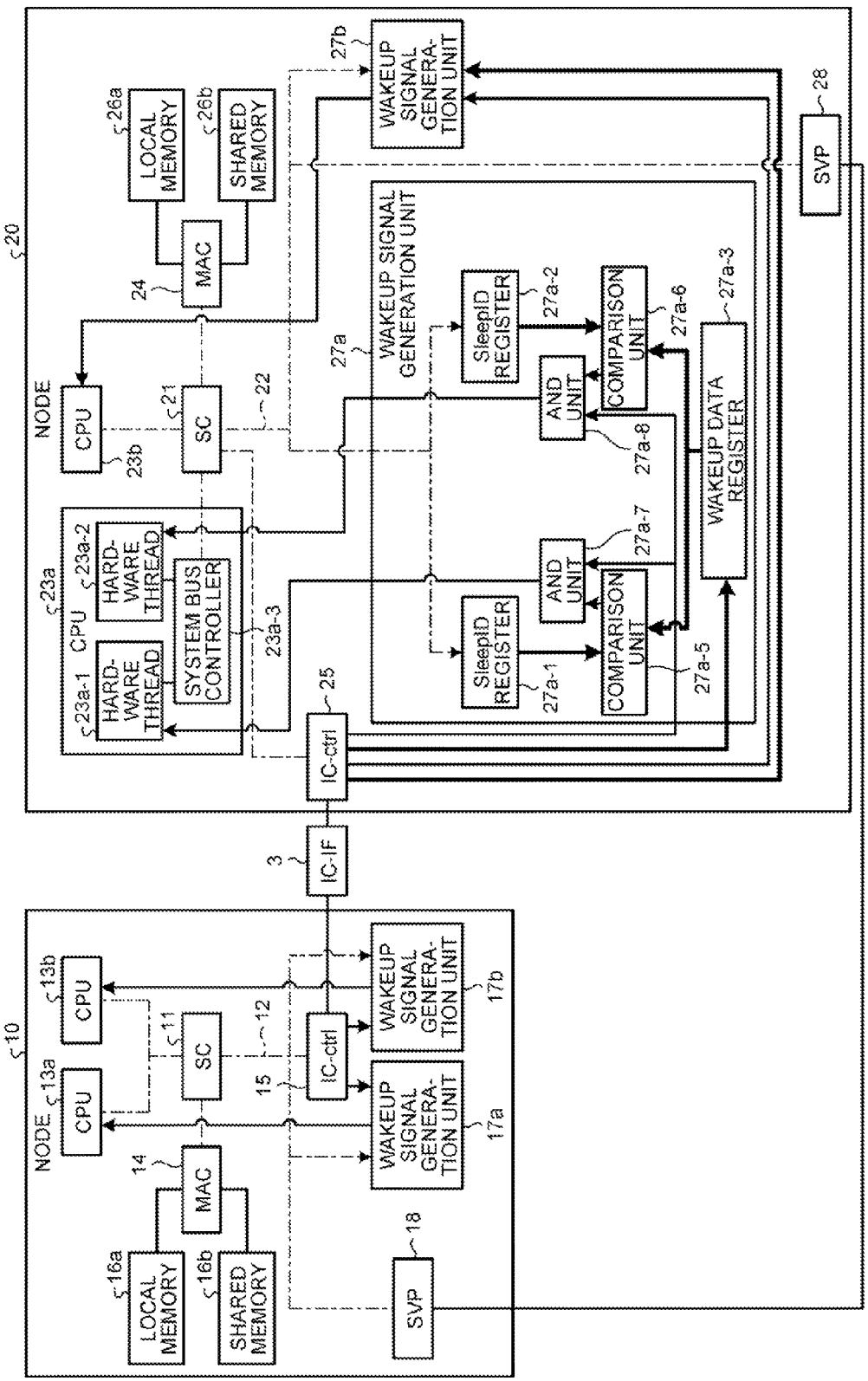
FIG. 1 is a block diagram illustrating a configuration of an information processing apparatus according to a first embodiment.

FIG. 1 is a block diagram illustrating a configuration of an information processing apparatus according to a first embodiment. In the following, SC stands for System Controller, CPU for Central Processing Unit, and MAC for Memory Access Controller. Moreover, IC-ctrl stands for Inter Connect-Controller, IC-IF for Inter Connect Interface, and SVP for Service Processor.

Moreover, in the following, the node represents the unit of an information processing unit. The SC controls processes such as data transfer between the CPU and the MAC, which are mounted on a node to control the entire node. The MAC is connected between a local memory and a shared memory, which are a memory such as a DIMM (Dual Inline Memory Module), and the SC to control access to the local memory and the shared memory.

Moreover, the IC-ctrl is a controller that controls communication between nodes. The IC-IF is an interface of communication between nodes by the IC-ctrl. The SVP is included in each node, is a processor that controls and monitors the hardware of each node independently of an arithmetic processing unit such as a CPU of each node, and transmits and receives information by communication via an SVP included in another node, a LAN (Local Area Network), and the like.

As illustrated in FIG. 1, an information processing apparatus 1 according to the first embodiment includes nodes 10 and 20. The node 10 includes an SC 11. The node 10 further includes CPUs 13*a* and 13*b*, a MAC 14, and an IC-ctrl 15, which are connected to the SC 11, respectively, via a system bus 12 indicated by an alternate long and short dash line in FIG. 1.

The node 10 further includes a local memory 16*a* and a shared memory 16*b*, which are connected to the MAC 14, respectively. The node 10 further includes WAKEUP signal generation units 17*a* and 17*b* that are connected to the IC-ctrl 15, respectively. The node 10 further includes an SVP 18.

The SC 11 transfers to the MAC 14 requests of the CPUs 13*a* and 13*b* to access the local memory 16*a* and the shared memory 16*b*. Moreover, the SC 11 transfers to the MAC 14 access by the node 20 to the shared memory 16*b*. Moreover, the SC 11 controls the input and output of information between the CPUs 13*a* and 13*b*, and the WAKEUP signal generation units 17*a* and 17*b*. Moreover, the SC 11 transfers to the IC-ctrl 15 access by the CPUs 13*a* and 13*b* to the node 20.

Moreover, the SC 11 inputs data from the CPUs 13*a* and 13*b* to the WAKEUP signal generation units 17*a* and 17*b* into the WAKEUP signal generation units 17*a* and 17*b*, respectively. Moreover, the IC-ctrl 15 inputs the data from the node 20 to the WAKEUP signal generation units 17*a* and 17*b* into the WAKEUP signal generation units 17*a* and 17*b*, respectively.

The node 20 has the identical configuration to that of the node 10, and an element that includes a different reference numeral and the same name has the identical configuration and function. The node 20 includes an SC 21, a system bus 22, CPUs 23*a* and 23*b*, a MAC 24, an IC-ctrl 25, a local memory 26*a*, a shared memory 26*b*, WAKEUP signal generation units 27*a* and 27*b*, and an SVP 28.

The SC 21, the system bus 22, the CPUs 23*a* and 23*b*, the MAC 24, the IC-ctrl 25 in the node 20 correspond to the SC 11, the system bus 12, the CPUs 13*a* and 13*b*, the MAC 14 and the CI-ctrl 15 in the node 10, respectively. Moreover, the local memory 26*a*, the shared memory 26*b* and the SVP 28 in the node 20 correspond to the local memory 16*a*, the shared memory 16*b* and the SVP 18 in the node 10, respectively. Moreover, the WAKEUP signal generation units 27*a* and 27*b* in the node 20 correspond to the WAKEUP signal generation units 17*a* and 17*b* in the node 10, respectively.

The nodes 10 and 20 may communicate with each other by being connected to the IC-ctrls 15 and 25 via an IC-IF 3. Moreover, the SVP 18 of the node 10 and the SVP 28 of the node 20 may communicate with each other by being connected via a predetermined communications line.

Configuration of CPU and WAKEUP Signal Generation Unit of First Embodiment

A description will be given of the configurations of the CPUs 13*a*, 13*b*, 23*a* and 23*b* with the CPU 23*a* as their representative. In other words, the configurations of the CPUs 13*a*, 13*b* and 23*b* are identical to that of the CPU 23*a*. Moreover, a description will be given of the configurations of the WAKEUP signal generation units 17*a*, 17*b*, 27*a* and 27*b* with the WAKEUP signal generation unit 27*a* as their representative. In other words, the configurations of the WAKEUP signal generation units 17*a*, 17*b* and 27*b* are identical to that of the WAKEUP signal generation unit 27*a*.

As illustrated in FIG. 1, the CPU 23*a* is, for example, a multicore CPU, and CPU cores included in the multicore CPU correspond to hardware threads 23*a*-1 and 23*a*-2. On the same core of the CPU 23*a*, the hardware threads 23*a*-1 and 23*a*-2 share the hardware resources of the CPU 23*a* to execute processes, respectively.

Moreover, the CPU 23*a* includes a system bus controller 23*a*-3, connected to the SC 21, that is an interface where the hardware threads 23*a*-1 and 23*a*-2 control data input and output to be performed by the CPU 23*a* via the system bus 22. In other words, the system bus controller 23*a*-3 is an input/output interface shared between the hardware threads 23*a*-1 and 23*a*-2.

Moreover, as illustrated in FIG. 1, the WAKEUP signal generation unit 27*a* includes SleepID registers 27*a*-1 and 27*a*-2, a WAKEUP data register 27*a*-3, comparison units 27*a*-5 and 27*a*-6, and AND units 27*a*-7 and 27*a*-8. Sleep Identifier is abbreviated to SleepID. The SleepID is identification information that identifies the hardware threads 23*a*-1 and 23*a*-2. When the hardware threads 23*a*-1 and 23*a*-2 suspend processes due to the occurrence of wait-for-data-input during the execution of the processes, the sleep IDs are outputted to the corresponding WAKEUP signal generation units 27a and 27b, respectively.

The SleepID register 27a-1, the comparison unit 27a-5, the AND unit 27a-7 are provided corresponding to the hardware thread 23a-1 of the CPU 23a. Similarly, the SleepID register 27a-2, the comparison unit 27a-6, the AND unit 27a-8 are provided corresponding to the hardware thread 23a-2 of the CPU 23a.

The SleepID register 27a-1 is a register that stores a SleepID to be outputted by the hardware thread 23a-1 to the WAKEUP signal generation unit 27a. The SleepID that identifies the hardware thread 23a-1 is outputted from the hardware thread 23a-1, is transmitted over the system bus 22 via the system bus controller 23a-3 and the SC 21, and is set in the SleepID register 27a-1.

Similarly, the SleepID register 27a-2 is a register that stores a SleepID to be outputted by the hardware thread 23a-2 to the WAKEUP signal generation unit 27a. The SleepID that identifies the hardware thread 23a-2 is outputted from the hardware thread 23a-2, is transmitted over the system bus 22 via the system bus controller 23a-3 and the SC 21, and is set in the SleepID register 27a-2.

The SleepIDs that identify the hardware threads of the CPUs 23a and 23b included in the node 20 are previously notified by the SVP 28 to the SVP 18 of the node 10 on startup of the system of the node 20. The SVP 18 stores the SleepIDs that identify the hardware threads of the CPUs 23a and 23b of the node 20, respectively, the Sleep Ids having been notified by the SVP 28, in an unillustrated memory, and makes the hardware threads of the CPUs 13a and 13b of the node 10 available.

Otherwise, the SleepIDs that identify the hardware threads of the CPUs 23a and 23b included in the node 20 may be notified to the node 10 for each process to be executed by the hardware thread. Otherwise, the SleepIDs may be notified to the node 10 upon output of the SleepID to be set in the corresponding SleepID register when a wait-for-data-input occurs to a process executed by the hardware thread. The notified SleepID may be, for example, stored by the SC 11 in the local memory 16a and the like via the MAC 14 to make the hardware threads of the CPUs 13a and 13b of the node 10 available.

The WAKEUP data resister 27a-3 is a register where the SleepIDs contained in WAKEUP data notified by the CPUs 13a and 13b of the node 10 via the IC-IF 3 and the IC-ctrl 25 are set. The WAKEUP data are data that notify the CPUs 23a and 23b of the node 20 that predetermined processes executed by the CPUs 13a and 13b of the node 10 are complete. The predetermined process is, for example, a process that the hardware thread of the CPU 13a or 13b of the node 10 copies data that the hardware thread 23a-1 or 23a-2 of the CPU 23a waits for from the local memory 16a of the node 10 to the shared memory 26b of the node 20.

The CPUs 23a and 23b of the node 20 stops the hardware threads to wait for the completion of the predetermined processes executed by the CPUs 23a and 23b, and starts the stopped hardware threads when the WAKEUP data are notified from the CPUs 13a and 13b. The CPUs 23a and 23b then acquire the data copied to the shared memory 26b via the system bus controller 23a-3 and the SC 21 to resume the suspended processes.

The comparison unit 27a-5 compares the SleepIDs set in the WAKEUP data register 27a-3 and the SleepID register 27a-1. When the SleepIDs set in the WAKEUP data register 27a-3 and the SleepID register 27a-1 agree with each other, the comparison unit 27a-5 outputs a select signal to the AND unit 27a-7.

The AND unit 27a-7 is a logical gate that ANDS the select signal outputted from the comparison unit 27a-5 and a packet reception pulse outputted from the IC-ctrl 25 at the timing of notification of the WAKEUP data from the CPUs 13a and 13b of the node 10. The IC-ctrl 25 generates one packet reception pulse when receiving a WAKEUP packet.

The AND unit 27a-7 outputs to the hardware thread 23a-1 a signal that indicates the AND of the select signal and the packet reception pulse. In other words, the AND unit 27a-7 outputs to the hardware thread 23a-1 an instruction to cancel the stop, start up and resume the process when the notified SleepID agrees with the SleepID set in the SleepID register 27a-1. The hardware thread 23a-1 cancels the stop, starts up and resumes the process in accordance with this instruction. In other words, the WAKEUP signal generated from the AND of the packet reception pulse and the select signal is turned on only for one pulse to cancel the stop state of the hardware thread 23a-1.

Similarly, the comparison unit 27a-6 compares the SleepIDs set in the WAKEUP data register 27a-3 and the SleepID register 27a-2. When the SleepIDs set in the WAKEUP data register 27a-3 and the SleepID register 27a-2 agree with each other, the comparison unit 27a-6 outputs a select signal to the AND unit 27a-8.

The AND unit 27a-8 is a logical gate that ANDS the select signal outputted from the comparison unit 27a-6 and the packet reception pulse outputted from the IC-ctrl 25 at the timing of notification of the WAKEUP data from the CPUs 13a and 13b of the node 10. The AND unit 27a-8 outputs to the hardware thread 23a-2 the signal that indicates the AND of the select signal and the packet reception pulse. In other words, the AND unit 27a-8 outputs to the hardware thread 23a-2 the instruction to cancel the stop, start up and resume the process when the notified SleepID agrees with the SleepID set in the SleepID register 27a-2. The hardware thread 23a-2 cancels the stop, starts up and resumes the process in accordance with this instruction.

Sequence of Processes of First Embodiment

Figure 2:
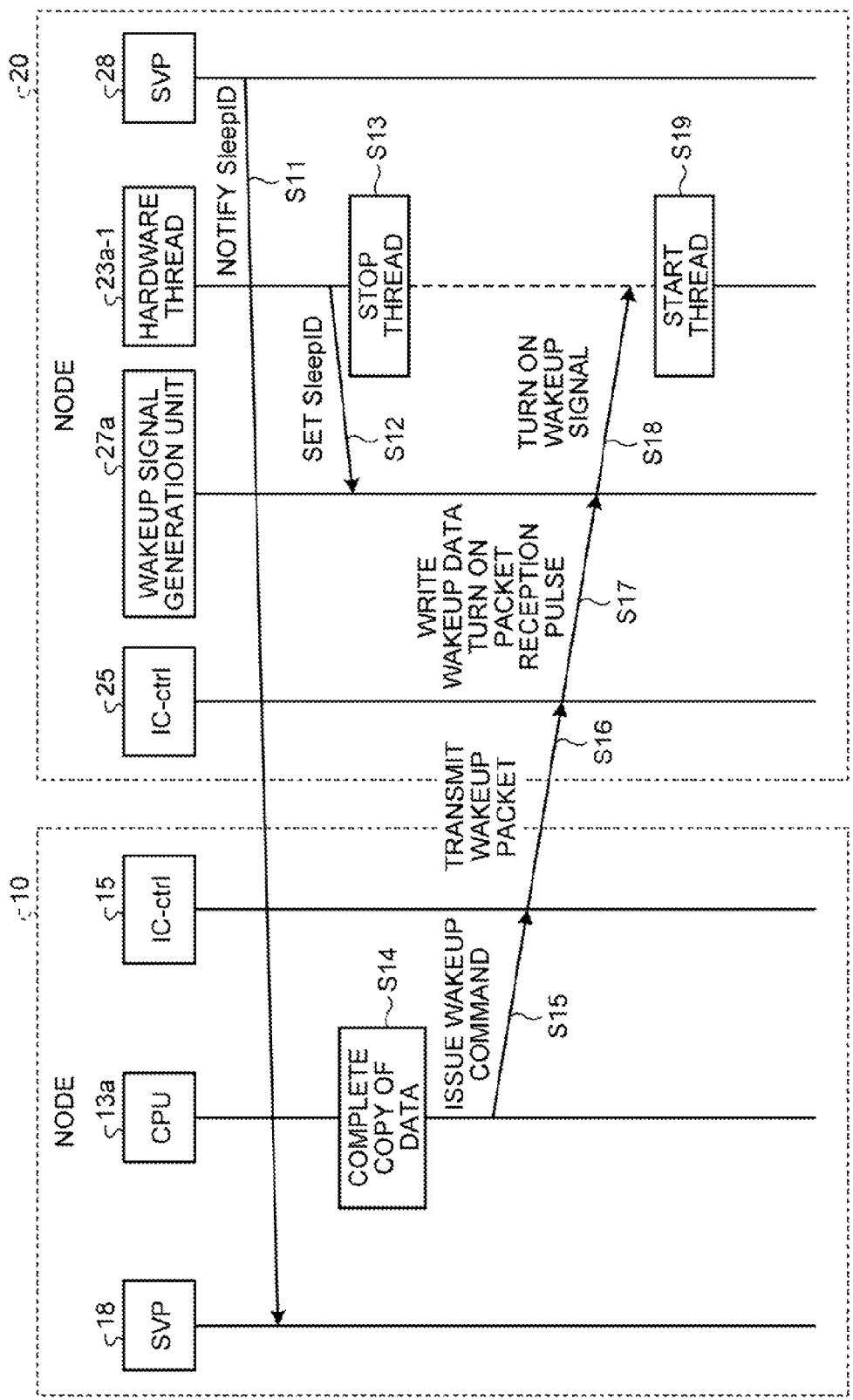
FIG. 2 is a sequence diagram illustrating processes according to the first embodiment.

FIG. 2 is a sequence diagram illustrating processes according to the first embodiment. FIG. 2 illustrates an example where the hardware thread 23a-1 of the node 20 needs data held by the node 10 during the execution of a process and waits until a process that the CPU 13a of the node 10 copies the data to the shared memory 26b of the node 20 is complete. However, FIG. 2 simply illustrates an example. When the hardware thread of the node 10 or 20 waits during the execution of a process until a process by another CPU of the node 10 or 20 is complete, the processes are similar.

Firstly, for example, on startup of the information processing apparatus 1 or the node 20, the SVP 28 of the node 20 notifies the SleepIDs of all hardware threads included in the node 20 to the SVP 18 of the node (Step S11). Step S11 is the process that the SVPs of the nodes previously notify another node of the SleepIDs being identification information of the hardware threads in their own nodes prior to the execution of processes in the hardware threads on startup of the information processing apparatus 1 or the nodes, and the like.

Next, the hardware thread 23a-1 of the node 20 sets the SleepID of the hardware thread 23a-1 in the SleepID register 27a-1 of the WAKEUP signal generation unit 27a (Step S12). Next, the hardware thread 23a-1 stops the thread (Step S13).

On the other hand, the CPU 13a of the node 10 performs a process to copy data stored in the local memory 16a of the node 10, the input of which the hardware thread 23a-1 of the node 20 waits for, to the shared memory 26b of the node 20, and completes the process (Step S14). Next, the CPU 13a issues a WAKEUP command including the SleepID of the hardware thread 23a-1 and the CPU ID of the CPU 23a including the hardware thread 23a-1 to output to the IC-ctrl 15 (Step S15). With the process of Step S15, the CPU 13a notifies the hardware thread 23a-1 of the node 20 that the process is complete.

Figure 3:
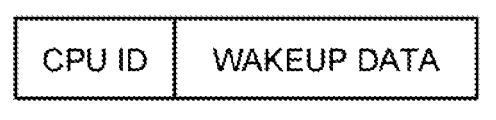

Next, based on the WAKEUP command issued by the CPU 13a, the IC-ctrl 15 of the node 10 generates a WAKEUP packet including, for example, the CPU ID and the WAKEUP data, which are illustrated in FIG. 3, to transmit to the IC-ctrl 25 of the node 20 (Step S16). CPU ID stands for Central Processing Unit Identifier, and is information that identifies a CPU. A node including a CPU of a transmission destination is determined from the CPU ID by a network relay apparatus; accordingly, the WAKEUP packet arrives at its destination node. Moreover, the WAKEUP data are data including at least the SleepID of the hardware thread 23a-1, the SleepID being previously notified by the SVP 28 of the node 20 in SepS11.

When receiving the WAKEUP packet from the IC-ctrl 15, the IC-ctrl 25 writes the SleepID contained in the WAKEUP data into the WAKEUP data register 27a-3, and outputs a packet reception pulse to the AND unit 27a-7 (Step S17). Next, the WAKEUP signal generation unit 27a outputs a WAKEUP signal to the hardware thread 23a-1 (Step S18). Next, when receiving the WAKEUP signal, the hardware thread 23a-1 starts the stopped thread (Step S19).

Time Chart of Processes of First Embodiment

FIG. 4 is a time chart illustrating processes according to the first embodiment. In FIG. 4, it is assumed that the hardware threads 23a-1 and 23a-2 of the CPU 23a use the system bus controller 23a-3 alternately for the input and output of data needed for their respective processes to execute. The data needed for their respective processes to execute are, for example, data of a program stored in the local memory 26a and data stored in the shared memory 26b.

FIG. 4 illustrates an example where the hardware thread 23a-1 of the node 20 needs data held by the node 10 during the execution of a process and waits until a process that the CPU 13a of the node 10 copies the data to the shared memory 26b of the node 20 is complete. However, FIG. 4 simply illustrates an example. When another hardware thread of the node 10 or 20 waits during the execution of a process until a process by another CPU of the node 10 or 20 is complete, the processes are similar. Further, In FIG. 4, it is illustrated that the illustrations of "1" correspond accesses to the system bus controller 23a-3 by the hardware threads 23a-1, and the illustrations of "2" correspond accesses to the system bus controller 23a-3 by the hardware threads 23a-2, on the right side of the illustrations that is "system bus controller 23a-3".

At time t1, the CPU 13a of the node 10 starts the process that copies the data needed by the hardware thread 23a-1 of the CPU 23a of the node 20 for a process to the shared memory 26b of the node 20. At time t2, the hardware thread 23a-1 needs the data that the CPU 13a copies to the shared memory 26b, but is not possible to continue the process since the copy of the data is incomplete, and falls in a state of waiting for the data. The hardware thread 23a-1 then stops the thread.

When the hardware thread 23a-1 stops the thread, the system bus controller 23a-3 is stopped to be accessed from the hardware thread 23a-1, and falls in an occupied state to be accessed only from the hardware thread 23a-2 that is executing another process. At time t3, when the copy of the data that the hardware thread 23a-1 has been waiting for is complete, the CPU 13a issues a WAKEUP command to start the hardware thread 23a-1. When starting up in accordance with the WAKEUP command, the hardware thread 23a-1 resumes the process and acquires the data copied to the shared memory 26b via the system bus controller 23a-3.

Flowchart of Processes of First Embodiment

FIG. 5 is a flowchart illustrating processes according to the first embodiment. FIG. 5 illustrates an example where the hardware thread 23a-1 of the node 20 needs data held by the node 10 during the execution of a process and waits until a process that the CPU 13a of the node 10 copies the data to the shared memory 26b of the node 20 is complete. However, FIG. 5 simply illustrates an example. When the hardware thread of the node 10 or 20 waits during the execution of a process until a process by another CPU of the node 10 or 20 is complete, the processes are similar.

Firstly, the node 10 causes the SVP 18 to receive the SleepIDs that identify the hardware threads of the CPUs 23a and 23b included in the node 20, the SleepIDs having been transmitted from the SVP 28 of the node 20 (Step S101). Step S101 is the process that the SVPs of the nodes previously notify another node of the SleepIDs being identification information of the hardware threads in their own nodes prior to the execution of processes in the hardware threads on startup of the information processing apparatus 1 or the nodes, and the like.

Next, the node 10 causes the MAC 14 to execute a process to copy the data that the hardware thread 23a-1 of the CPU 23a waits to be copied, the data being held by the node 10, to the shared memory 26b of the node 20 (Step S102). The process of Step S102 may be executed by an unillustrated DMA controller provided to the MAC 14.

Next, the node 10 causes the CPU 13a to determine whether the process of Step S102 has ended (Step S103). When determining that the process of Step S102 has ended (Step S103 Yes), the node 10 moves the process to Step S104. On the other hand, when not determining that the process of Step S102 has ended (Step S103 No), the node 10 moves the process to Step S102 and continues the process of Step S102 by the MAC 14, the unillustrated DMA controller, or the like.

Next, the node 10 causes the CPU 13a to designate a CPU ID and a SleepID and issue a WAKEUP command (Step S104). Here, for example, the ID of the CPU 23a of the node 20 is designated as the CPU ID, and the SleepID of the hardware thread 23a-1 as the SleepID. Next, the node 10 causes the CPU 13a to generate a WAKEUP packet in accordance with the WAKEUP command issued in Step S104 and transmit the WAKEUP packet to the node 20 (Step S105).

On the other hand, the node 20 causes the SVP 28 to transmit to the SVP 18 of the node 10 the SleepIDs that identify the hardware threads of the CPUs 23a and 23b included in the node 20 (Step S201). Step S201 is the process that the SVPs of the nodes previously notify another node of the SleepIDs being identification information of the hardware threads in their own nodes prior to the execution of processes in the hardware threads on startup of the information processing apparatus 1 or the nodes, and the like.

Next, the node 20 causes the hardware threads of the CPUs 23a and 23b to execute their respective processes (Step S202). Next, the node 20 causes the hardware threads of the CPUs 23a and 23b to determine whether to wait for the completion of the process of Step S102 in the node 10 during the execution of the process of Step S202 (Step S203).

When determining to wait for the completion of the process in Step S102 in the node 10 (Step S203 Yes), the node 20 moves the process to Step S204. When not determining to wait for the completion of the process in Step S102 in the node 10 (Step S203 No), the node 20 moves the process to Step S202 and causes the hardware threads to continue the processes. Here, for example, the hardware thread that has been determined to wait for the completion of the process of Step S102 in the node 10 is the hardware thread 23a-1.

Next, the node 20 causes the hardware thread 23a-1 that waits for the completion of the process in the node 10 to set the SleepID of the hardware thread 23a-1 in the SleepID register 27a-1 (Step S204). Next, the node 20 suspends the process that is being executed by the hardware thread 23a-1 (the suspended process is hereinafter referred to as the suspended process) and stops the thread (Step S205).

Next, the node 20 causes the WAKEUP signal generation unit 27a to determine whether to have received the WAKEUP packet from the node 10 (Step S206). When determining that the WAKEUP packet has been received from the node 10 (Step S206 Yes), the node 20 moves the process to Step S207. On the other hand, when not determining that the WAKEUP packet has been received (Step S206 No), the node 20 repeats Step S206.

Next, the node 20 causes the WAKEUP signal generation unit 27a to set the WAKEUP data of the WAKEUP packet in the WAKEUP data register 27a-3 (Step S207).

Next, the node 20 causes the comparison unit 27a-5 to determine whether the value of the SleepID register 27a-1 is equal to the SleepID contained in the WAKEUP data of the WAKEUP data register 27a-3 (Step S208). When determining that the value of the SleepID register 27a-1 is equal to the SleepID contained in the WAKEUP data of the WAKEUP data register 27a-3 (Step S208 Yes), the node 20 moves the process to Step S209. When not determining that the value of the SleepID register 27a-1 is equal to the SleepID included in the WAKEUP data of the WAKEUP data register 27a-3 (Step S208 No), the node 20 moves the process to Step S206.

Next, the node 20 causes the AND unit 27a-7 to generate a WAKEUP signal to output to the hardware thread 23a-1 (Step S209). Next, the node 20 causes the hardware thread 23a-1 to start the hardware thread stopped in Step S205 in response to the output of the WAKEUP signal (Step S210) and resume the suspended process (Step S211).

Effects of First Embodiment

The other hardware threads may occupy CPU resources such as a system bus controller compared with the polling system that uses the resources of a CPU at predetermined cycles while a part of the hardware threads sharing the system bus controller is being stopped in the CPU. Therefore, the other hardware threads may execute more processes. Moreover, resister saving and restoration processes by the OS processing at the time of resuming the process are not needed; accordingly, it is possible to shorten a time needed to start a hardware thread and resume a process compared with the interrupt system. Moreover, a SleepID is fixed to a hardware thread to enable an instruction to start the hardware thread without notification of the SleepID between processes.

Moreover, a SleepID is designated to make notification with a WAKEUP signal; accordingly, it is possible to start and stop a process on a specific hardware thread. Therefore, it is possible to prevent a wrong process from being started and stopped. Furthermore, a CPU ID is designated to start a process of a hardware thread; accordingly, it is possible to control synchronization of a communication process between CPUs.

[b] Second Embodiment

With regard to elements of an information processing apparatus according to a second embodiment, the same names and reference numerals are assigned to elements including the identical functions and processes to those of the information processing apparatus according to the first embodiment, and their descriptions will be omitted, and only elements including different functions and processes will be described.

Configuration of Information Processing Apparatus of Second Embodiment

FIG. 6 is a block diagram illustrating a configuration of the information processing apparatus according to the second embodiment. As illustrated in FIG. 6, an information processing apparatus 2 of the second embodiment includes nodes 30 and 40. Compared with the node 10 of the information processing apparatus 1 according to the first embodiment, the node 30 includes WAKEUP signal generation units 37a and 38a instead of the WAKEUP signal generation unit 17a. Moreover, the node 30 includes WAKEUP signal generation units 37b and 38b instead of the WAKEUP signal generation unit 17b.

The node 40 has the identical configuration to that of the node 30, and an element including a different reference numeral and the same name has the identical configuration and function. Compared with the node 20 of the information processing apparatus 1 according to the first embodiment, the node 40 includes WAKEUP signal generation units 47a and 48a instead of the WAKEUP signal generation unit 27a. Moreover, the node 40 includes WAKEUP signal generation units 47b and 48b instead of the WAKEUP signal generation unit 27b.

Configuration of WAKEUP Signal Generation Unit of Second Embodiment

A description will be given of the configurations of the WAKEUP signal generation units 37a, 37b, 47a and 47b with the WAKEUP signal generation unit 47a as their representative. In other words, the configurations of the WAKEUP signal generation units 37a, 37b and 47b are identical to that of the WAKEUP signal generation unit 47a.

As illustrated in FIG. 6, the WAKEUP signal generation unit 47a includes the SleepID register 27a-1, the WAKEUP data register 27a-3, the comparison unit 27a-5, the AND unit 27a-7, a timer 27a-9, and an OR unit 27a-11. The WAKEUP signal generation unit 47a is provided corresponding to the hardware thread 23a-1. Similarly, the WAKEUP signal generation unit 48a is provided corresponding to the hardware thread 23a-2. Similarly, the WAKEUP signal generation units 47b and 48b are provided corresponding to the hardware threads included in the CPU 23b.

The hardware threads of the CPUs 13a, 13b, 23a and 23b read the contents of their corresponding WAKEUP data registers. When the received WAKEUP data agree with the SleepIDs of the SleepID registers of their respective WAKEUP signal generation units in the WAKEUP signal generation units 37a to 48b, the SleepIDs are written into their respective WAKEUP data registers. Therefore, when a plurality of hardware threads is in a state of waiting for a process, the hardware threads access their corresponding WAKEUP data registers, which makes it possible to confirm the receipt of the WAKEUP data destined to their own hardware threads. Moreover, the WAKEUP data registers are prevented from being updated with WAKEUP data destined to the other hardware threads before the WAKEUP data written in the WAKEUP data registers are read by their corresponding hardware threads.

The timer 27a-9 is a timer that sets the value of the timer via the system bus 22 when the hardware thread 23a-1 outputs the SleepID of the hardware thread 23a-1 upon suspending a process due to the occurrence of wait-for-data-input during the execution of the process. The timer 27a-9 subtracts the value of the timer at predetermined intervals of time when a predetermined value of the timer is set, and outputs an ON signal to the OR unit 27a-11 when the value of the timer becomes 0.

In the second embodiment, the AND unit 27a-7 outputs to the OR unit 27a-11a signal indicating the AND of a select signal outputted from the comparison unit 27a-5 and a packet reception pulse outputted from the IC-ctrl 25. The OR unit 27a-11 is a logical gate that ORs the signal indicating the AND outputted from the AND unit 27a-7 and the ON signal outputted from the timer 27a-9. In other words, the OR unit 27a-11 outputs to the hardware thread 23a-1 an instruction to cancel the stop, start up and resume the process when the timer 27a-9 times a predetermined time. Otherwise, the OR unit 27a-11 outputs to the hardware thread 23a-1 an instruction to cancel the stop, start up and resume the process when the notified SleepID agrees with the SleepID set in the SleepID register 27a-1. The hardware thread 23a-1 cancels the stop, starts up and resumes the process in accordance with this instruction.

Similarly, a timer included in the WAKEUP signal generation unit 48a is a timer that sets the value of the timer when the hardware thread 23a-2 outputs the SleepID of the hardware thread 23a-2 upon suspending a process due to the occurrence of wait-for-data-input during the execution of the process. The timer included in the WAKEUP signal generation unit 48a subtracts the value of the timer at predetermined intervals of time when a predetermined value of the timer is set, and outputs an ON signal to an OR unit included in the WAKEUP signal generation unit 48a when the value of the timer becomes 0.

Processes of Second Embodiment

FIG. 7 is a flowchart illustrating processes according to the second embodiment. FIG. 7 illustrates an example where the hardware thread 23a-1 of the node 40 needs data held by the node 30 during the execution of a process and waits until a process that the CPU 13a of the node 30 copies the data to the shared memory 26b of the node 40 is complete. However, FIG. 7 simply illustrates an example. When the hardware thread of the node 30 or 40 waits during the execution of a process until a process by another CPU of the node 30 or 40 is complete, the processes are similar.

In FIG. 7, the processes in the node 30 are identical to the processes in the node 10 of the first embodiment illustrated in FIG. 5; therefore, the descriptions are omitted. On the other hand, the node 40 causes the SVP 28 to transmit, to the SVP 18 of the node 30, the SleepIDs that notify the hardware threads of the CPUs 23a and 23b included in the node 40 (Step S401). Step S401 is the process that the SVPs of the nodes previously notify another node of the SleepIDs being identification information of the hardware threads in their own nodes prior to the execution of processes in the hardware threads on startup of the information processing apparatus 2 or the nodes, and the like.

Next, in the hardware threads of the CPUs 23a and 23b, the node 40 executes their respective processes (Step S402). Next, the node 40 causes the hardware threads of the CPUs 23a and 23b to determine whether to wait for the completion of the process of Step S102 in the node 30 during the execution of the process of Step S402 (Step S403).

When determining to wait for the completion of the process in Step S102 in the node 30 (Step S403 Yes), the node 40 moves the process to Step S404. When not determining to wait for the completion of the process in Step S102 in the node 30 (Step S403 No), the node 40 moves the process to Step S402 and causes the hardware threads to continue the processes. Here, for example, the hardware thread that has been determined to wait for the completion of the process of Step S102 in the node 30 is the hardware thread 23a-1.

Next, the node 40 causes the hardware thread 23a-1 that waits for the completion of the process to set the SleepID of the hardware thread 23a-1 in the SleepID register 27a-1 and set the value of the timer in the timer 27a-9 (Step S404). Next, the node 40 suspends the process that is being executed by the hardware thread 23a-1 (the suspended process is hereinafter referred to as the suspended process) and stops the thread (Step S405). Next, the node 40 causes the WAKEUP signal generation unit 47a to execute a WAKEUP signal ON process to be described later with reference to FIG. 8 (Step S406).

Next, the node 40 determines whether the WAKEUP signal generation unit 47a has turned on the WAKEUP signal (Step S407). When determining that the WAKEUP signal has been turned on (Step S407 Yes), the node 40 starts the hardware thread 23a-1 that was stopped in Step S405 (Step S408). when not determining that the WAKEUP signal has been turned on (Step S407 No), the node 40 moves the process to Step S406.

Next, the node 40 causes the hardware thread 23a-1 to determine whether the SleepID of its own thread has been set in the WAKEUP data register 27a-3 (Step S409). When determining that the SleepID of its own thread has been set in the WAKEUP data register 27a-3 (Step S409 Yes), the hardware thread 23a-1 resumes the suspended process (Step S410). When not determining that the SleepID of its own thread has been set in the WAKEUP data register 27a-3 (Step S409 No), the hardware thread 23a-1 handles process switching (Step S411). The hardware thread 23a-1 then executes another process that is different from the suspended process (Step S412).

Next, the hardware thread 23a-1 determines whether the SleepID of its own thread has been set in the WAKEUP data register 27a-3 (Step S413). When determining that the SleepID of its own thread has been set in the WAKEUP data register 27a-3 (Step S413 Yes), the hardware thread 23a-1 switches processes (Step S414), and resumes the suspended process (Step S410). When not determining that the SleepID of its own thread has been set in the WAKEUP data register 27a-3 (Step S413 No), the hardware thread 23a-1 repeats Step S413 by the polling process.

Flowchart of WAKEUP signal ON process of Second Embodiment

FIG. 8 is a flowchart illustrating a WAKEUP signal ON process according to the second embodiment. The WAKEUP signal ON process according to the second embodiment is the process illustrated in Step S406 of FIG. 7.

The node 40 causes the WAKEUP signal generation unit 47a to determine whether the timer 27a-9 has timed out (Step S406a). When determining that the timer 27a-9 has timed out (Step S406a Yes), the node 40 causes the WAKEUP signal generation unit 47a to turn on the WAKEUP signal (Step S406e). On the other hand, when not determining that the timer 27a-9 has timed out (Step S406a No), the node 40 causes the WAKEUP signal generation unit 47a to determine whether the WAKEUP packet has been received from the node (Step S406b).

When determining that the WAKEUP packet has been received from the node 30 (Step S406b Yes), the node 40 moves the process to Step S406c. On the other hand, when not determining that the WAKEUP packed has been received from the node 30 (Step S406b No), the node 40 moves the process to Step S406a.

Next, the node 40 causes the comparison unit 27a-5 to determine whether the value of the SleepID register 27a-1 is equal to the SleepID included in the received WAKEUP data (Step S406c). When determining that the value of the SleepID register is equal to the SleepID included in the received WAKEUP data (Step S406c Yes), the node 40 moves the process to Step S406d. When not determining that the value of the SleepID register is equal to the SleepID included in the received WAKEUP data (Step S406c No), the node 40 moves the process to Step S406a.

Next, the node 40 causes the WAKEUP signal generation unit 47a to set the WAKEUP data of the received WAKEUP packet in the WAKEUP data register 27a-3 (Step S406d). Next, the node 40 causes the WAKEUP signal generation unit 47a to turn on the WAKEUP signal to output to the hardware thread 23a-1 (Step S406e). When the process of Step S406e ends, the node 40 moves the process to Step S407 illustrated in FIG. 7.

Effects of Second Embodiment

When executing a certain process for a fixed period of time, the OS switches execution to another process; accordingly, when a thread is stopped over a long time, even when a start instruction is received, the process may time out to automatically switch to an unintended another process. Therefore, it is possible to prevent the OS from switching a running process to another process by starting a hardware thread using a timer before the switching of a process.

Moreover, it is possible for a process to manage the switching of a process in combination with a timer and a WAKEUP data register by intentionally switching processes to execute from a running process to a process desired to execute next.

In the first and second embodiments, the stop state of a hardware thread is set as a first state, and the running state of a hardware thread is set as a second state. It is assumed that the hardware of another node that has written data held by the node and ended notifies the end to a hardware thread in the first state, which waits for the ending of write of the data. It is assumed that in response to the notification, the hardware thread shifts from the first state to the second state. However, the technology of the disclosure is not limited to that the first state is the stop state of a hardware thread and the second state is the running state of a hardware thread. In other words, the technology of the disclosure may be widely applied to a technology for, when a hardware thread is in the first state until a process running on the hardware thread of its own node or another node shifts to an expected state, designating the hardware thread, notifying a shift to the expected state, and shifting from the first state to the second state.

The number of nodes included in the information processing apparatuses 1 and 2 in the first and second embodiments, the number of CPUs included in each node, and the number of hardware threads included in each CPU may be arbitrarily changed. Moreover, the WAKEUP signal generation unit provided corresponding to each hardware thread may be provided for each CPU as in the first embodiment or provided for each hardware thread as in the second embodiment.

Effective use of hardware resources can be promoted when processors included in a plurality of nodes control synchronization between processes to execute in their respective processing units.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus that includes a plurality of nodes, each of the nodes comprising:
  a CPU (Central Processing Unit) that includes a plurality of hardware threads, a first hardware thread among the plurality of hardware threads being configured to execute a first process and control a state of the first process between a first state and a second state in the first hardware thread, the first state indicating a running state and the second state indicating a stop state, and a second hardware thread in another CPU being configured to execute a second process which generates data that is required by the first process;
  a memory unit that stores therein a first identification information that identifies the first hardware thread wherein the first hardware thread stores the first identification information into the memory unit and transmits second identification information that identifies the first hardware thread to the second hardware thread prior to the first hardware thread executing the first process, the first hardware thread subsequently shifting the state of the first process from the first state to the second state to wait for completion of the second process when it is determined that the first process needs the data generated by the second process in order to continue execution;
  a receiving unit that receives the second identification information, from the second hardware thread wherein the second hardware thread executes the second process, generating and storing the data into a shared memory unit that is shared with the first hardware thread, and transmits the second identification information back to the first hardware thread upon completing the second process; and a plurality of output units that are respectively provided for the plurality of hardware threads, wherein an output unit corresponding to the first hardware thread outputs to the first hardware thread a control signal that shifts the state of the first process from the second state to the first state without invoking a process executed by an operating system, upon the second identification information received by the receiving unit matching the first identification information stored in the memory unit, the first hardware thread resuming execution of the first process, by acquiring the data stored in the shared memory unit, in response to the state of the first process shifting from the second state to the first state.

2. The information processing apparatus according to claim 1, wherein each of the nodes further comprises a timing unit that times a time elapsed from a predetermined timing, and the output unit generates and outputs the control signal regardless of whether the receiving unit has received the second identification information, when the timing unit times a predetermined time from the predetermined timing.

3. The information processing apparatus according to claim 2, wherein upon receiving the control signal outputted by the output unit when the timing unit times the predetermined time, the first hardware thread executes a process different from the first process whose state has been shifted from the first state to the second state.

4. The information processing apparatus according to claim 1, wherein when the second hardware thread completes the second process that the completion thereof the first hardware thread waits for, the second hardware thread transmits to a node including the CPU that includes the first hardware thread the second identification information that has been previously transmitted to the second hardware thread.

5. The information processing apparatus according to claim 1, wherein the receiving unit receives the second identification information via an interface of communication between the nodes.

6. A method of controlling an information processing apparatus that includes a plurality of nodes, each of the nodes including a CPU (Central Processing Unit) that includes a plurality of hardware threads, a hardware thread among the plurality of hardware threads being configured to execute a first process and control a state of the first process between a first state and a second state in the first hardware thread, the first state indicating a running state and the second state indicating a stop state, and a second hardware thread in another CPU being configured to execute a second process which generates data that is required by the first process, the method comprising:

storing in a memory unit, a first identification information that identifies the first hardware thread wherein the first hardware thread stores the first identification information into the memory unit and transmits second identification information that identifies the first hardware thread to the second hardware thread prior to the first hardware thread executing the first process, the first hardware thread subsequently shifting the state of the first process from the first state to the second state to wait for completion of the second process when it is determined that the first process needs the data generated by the second process in order to continue execution;

receiving the second identification information, from the second hardware thread wherein the second hardware thread executes the second process, generating and storing the data into a shared memory unit that is shared with the first hardware thread, and transmits the second identification information back to the first hardware thread upon completing the second process;

outputting, from an output unit among a plurality of output units that are respectively provided for the plurality of hardware threads, wherein the output unit corresponds to the first hardware thread, to the first hardware thread a control signal that shifts the state of the first process from the second state to the first state without invoking a process executed by an operating system, upon the second identification information received at the receiving matching the first identification information stored in the memory unit, the first hardware thread resuming execution of the first process, by acquiring the data stored in the shared memory unit, in response to the state of the first process shifting from the second state to the first state.

* * * * *